D. M. SKINNER.
Coffee Pot.

No. 85,540. Patented Jan. 5, 1869.

Witnesses:
S. N. Piper
J. K. Snow

Inventor:
Dan'l. M. Skinner
by his attorney
R. H. Eddy

DANIEL M. SKINNER, OF SANDWICH CENTRE, NEW HAMPSHIRE.

Letters Patent No. 85,540, dated January 5, 1869.

IMPROVEMENT IN COFFEE-POTS.

The Schedule referred to in these Letters Patent and making part of the same.

*To all persons to whom these presents may come:*

Be it known that I, DANIEL M. SKINNER, of Sandwich Centre, in the county of Carroll, and State of New Hampshire, have made a new and useful invention, having reference to Pots or Vessels for Making Decoctions of Tea, Coffee, or other material; and do hereby declare the same to be fully described in the following specification, and represented in the accompanying drawings, of which—

Figure 1 is a side elevation, and

Figure 2, a vertical section of a coffee or tea-pot, provided with my invention.

In such drawings—

Figure 1:
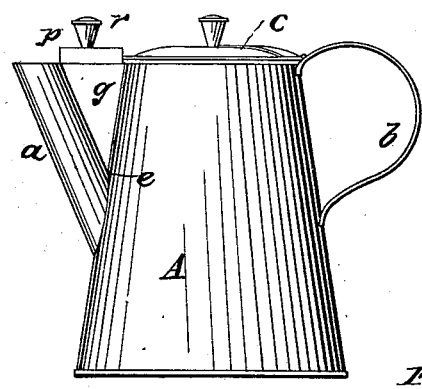

A denotes a coffee or tea-pot, of ordinary form, it being provided with a tubular spout, $a$, a handle, $b$, and a cover, $c$.

The spout has a narrow opening, $d$, extending down its rear part, from its top to its junction with the body $e$ of the pot, and, from such junction upward, there is another such opening, $f$, made in the front of the body. These two openings have an edge of each joined by one of two parallel plates, $g$ $g$, so as to form a narrow conduit, $q$, leading from the body into the spout, the entire length of the latter, or up to the top of the body.

When the decoction-apparatus is out of the pot A, this conduit not only operates to increase the flowage of liquid from the body into the spout, during the process of discharging liquid from the body by means of the spout, but permits air to pass into the body, and over the surface of the liquid, in order to supply the space exhausted of liquid with the quantity of air necessary to prevent interruption of the flowage of liquid out of the spout.

The said conduit, however, is for another purpose, viz, that of receiving a narrow arm or stem, $h$, which projects upward from a foraminous box, B, or the cover $i$ thereof.

This box has a cylindrical shape, its sides and ends being formed with numerous minute holds, to allow a liquid to either freely enter or pass out of the said box through such holes. There is an opening or mouth $k$, to the box, such opening being made in the periphery of the box, and provided with a curved cover, $i$, fitted, at its upper edges, in grooves $l$ $l$, so as to enable it to be slid on and off the opening or mouth.

At the upper part of the front edge of the arm $h$, a tube or false nose, $m$, is fixed, there being a notch, $n$, made in the arm, at the base of the said nose. The external diameter of the false nose is to be equal to or a very little less than the internal diameter of the spout $a$, in order that the said false nose may be introduced or slid endwise into the spout.

Furthermore, in the rear of the cover $i$ is a plate, or spout-closer, $o$, it being arranged with the box B and the arm $h$ in manner as represented in the drawings. At the upper end of the arm, and fastened thereto, is a tube-stop or cover, $p$, to the conduit $q$, such cover being provided with a knob, $r$, extended upward from it.

Figure 2:
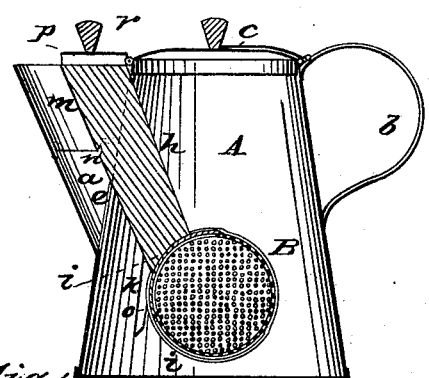
Figure 3:
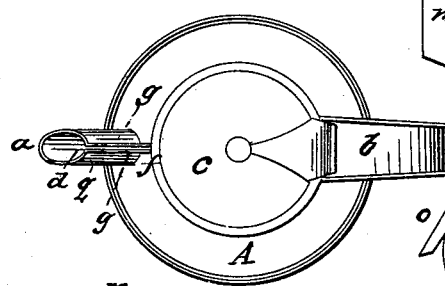
Figure 3 is a top view of the pot, as it appears without the decoction-apparatus for holding the coffee or tea.
Figure 4:
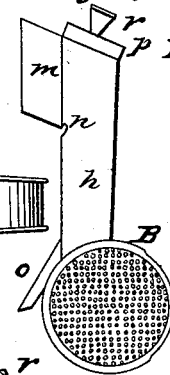
Figure 4 is a side view.
Figure 5:
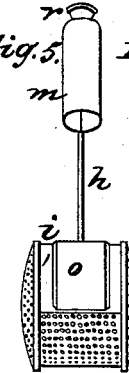
Figure 5 is a front elevation of such apparatus.
Figure 6:
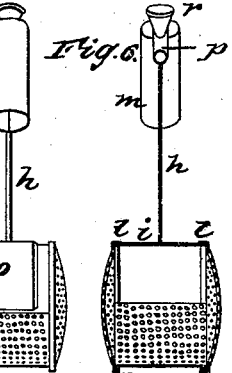
Figure 6 is a transverse section of the box or strainer and its cover, constituting parts of such apparatus.

Fig. 2 represents, in black lines, the position in the pot of the box B, its arm, and the false nose, while such box is employed in making a decoction from a mass of coffee or tea placed within it.

Figure 7:
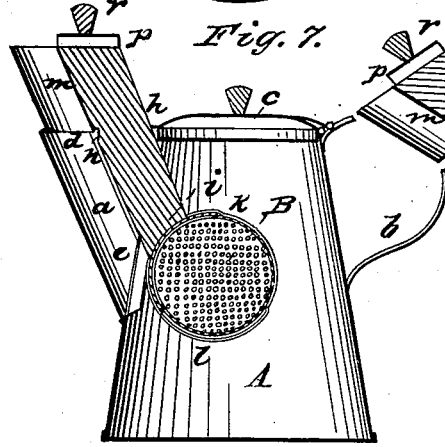

Figure 7 is a longitudinal section of the pot and decoction-apparatus, with the latter elevated into a position to cause the spout-closer $o$ to rest against and cover the lower end of the spout $a$, the same being in order to elevate the box B within the pot, and close the spout, so as to prevent the escape of steam from the spout during the process of steaming the contents of the box, which may be done preparatory to immersing them, or the box containing them, in the hot water, the upper surface of the water under such circumstances being below the box.

Figure 8:
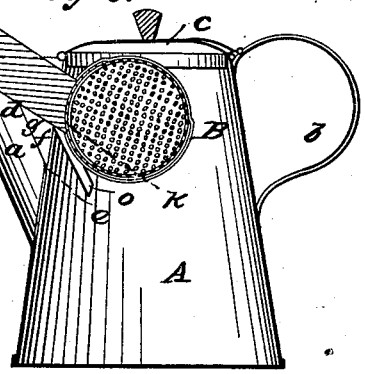

Figure 8 is another section of the coffee-pot and the decoction-apparatus, the latter being represented as in another position, whereby the box is brought up into and supported in the upper part of the pot, in order to effect drainage of liquor from the contents of the box, or enable such box, when open, either to be used as a strainer to strain a liquid while being poured into the pot, or into a mass of coffee or tea when in such box.

The false nose or tube $m$, when within the spout, allows the liquid from the pot to escape through the spout, while the pot is in the act of having liquid poured from it, and such nose aids in sustaining the box B, when in the position as represented in fig. 7. The notch $m$, by catching on the top of the spout, in manner as shown in fig. 8, aids in supporting the box B in the position as shown in such figure.

I make no claim to the use, in a vessel or pot, or in a liquid contained therein, of a foraminous box, for holding tea, coffee, or other material, in order to produce a decoction from such material, and facilitate the removal of the material from the liquid.

What I claim as my invention in the above-described coffee or tea-pot and its decoction-apparatus, is as follows:

I claim the arrangement of the conduit $q$ with the body $e$ and spout $a$ of the pot, in manner substantially as specified.

I also claim the arrangement and combination of the supporting-arm $h$ with the foraminous box B, or its cover.

I also claim the combination of the said arm $h$ and box B with the pot A, its spout $a$, and the conduit $q$, for the reception of the arm.

I also claim the arrangement and combination of the false nose *m* with the arm *h* and the foraminous box B.

I also claim the arrangement and combination of the spout-closer *o* with the foraminous box B and its arm *h*, to be applied to the pot A, provided with the conduit *q*, arranged with its body and spout, as set forth.

I also claim the combination and arrangement of the notch *n* with the arm *h*, when combined with the box B, and for use in the pot A, provided with the conduit *q*, as set forth.

I also claim the combination and arrangement of the stop or conduit-cover *p* with the arm *h*, when combined with the box B, and for use in the pot A, provided with the conduit *q*, as explained.

DANIEL M. SKINNER.

Witnesses:
MERRITT AMBROSE,
OLIVER L. AMBROSE.